Oct. 15, 1935.   F. GRAY   2,017,092

SCANNING APPARATUS

Filed May 21, 1931   2 Sheets-Sheet 1

INVENTOR
F. GRAY
BY
C. A. Sprague.
ATTORNEY

Oct. 15, 1935. F. GRAY 2,017,092
SCANNING APPARATUS
Filed May 21, 1931 2 Sheets-Sheet 2
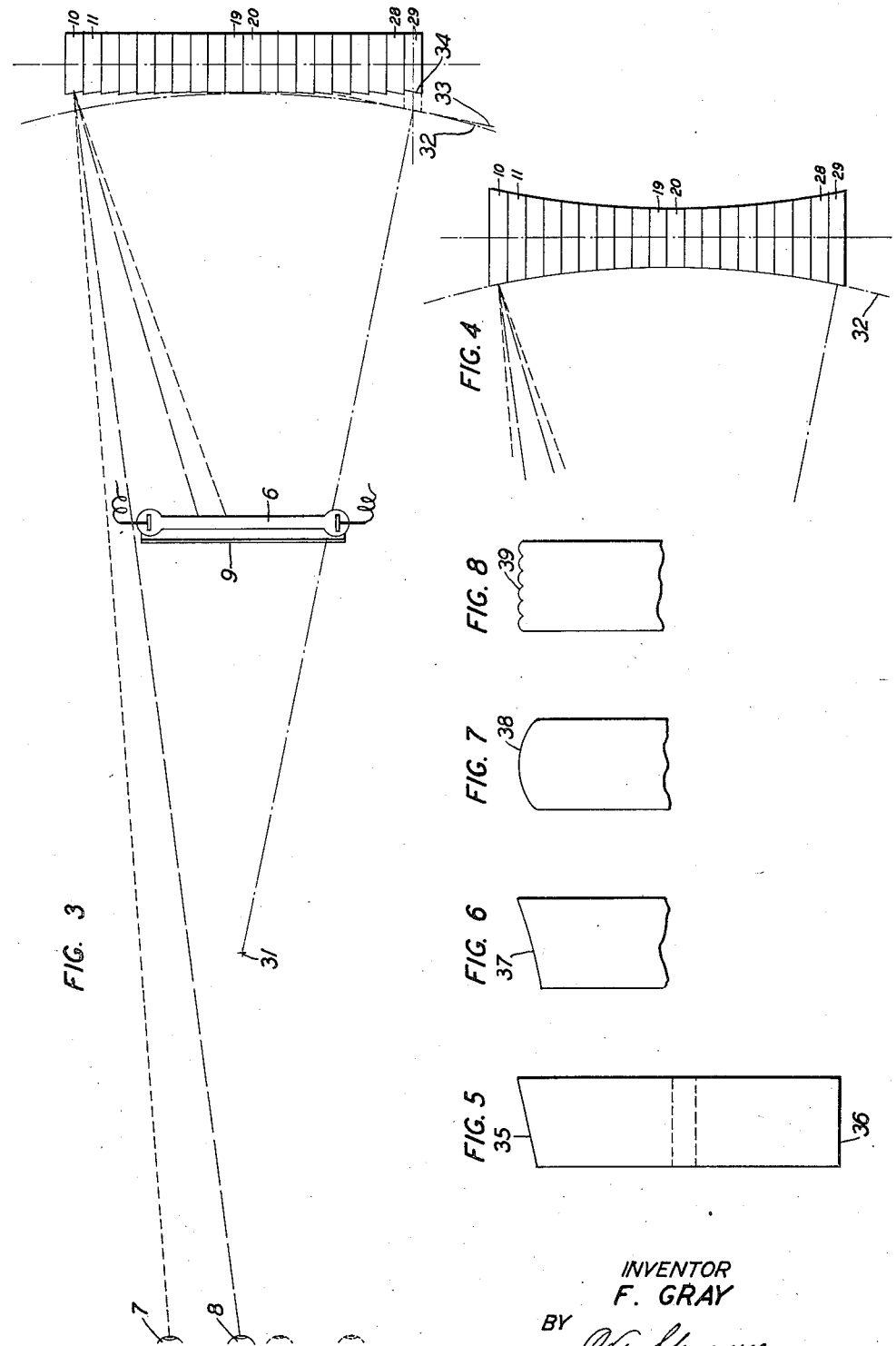
INVENTOR
F. GRAY
BY
ATTORNEY Patented Oct. 15, 1935

2,017,092

UNITED STATES PATENT OFFICE 2,017,092

SCANNING APPARATUS

Frank Gray, New York, N. Y., assignor to Bell Telephone Laboratories, Incorporated, New York, N. Y., a corporation of New York Application May 21, 1931, Serial No. 538,959

20 Claims. (Cl. 178—6)

This invention relates to electro-optical systems and more particularly to television receiving systems.

An object of the invention is to provide an improved arrangement for direct viewing of electro-optical images by light reflected from mirror surfaces.

Another object is to provide improved mirror helix scanning means.

A feature of the invention is a mirror helix associated with a relatively short variable light source in such a manner that television images may be seen by looking directly at the reflecting faces of the mirror helix as it rotates. The arrangement functions by reason of the fact that diffuse light is radiated from the light source to the mirror helix, the mirrors of which generate reflected beams which successively pass through a given point in space. For viewing, the eye is located at such a point and the image appears as though in a window having the relative proportions of the rotating mirror as a whole. For any given arrangement there are several points from which the image may be viewed so that a single observer may use both eyes for viewing or so that several observers may view it simultaneously.

Another feature of the invention is a mirror helix in which the reflecting surfaces are given a slope or contour or both such that, when a relatively short strip light source is employed, all of the surfaces will in turn reflect rays through the same region in space, in which the observers' eyes are positioned.

In accordance with another feature of the invention the direction and spread of the reflected beams transversely to a plane perpendicular to the axis of rotation of a mirror helix and passing through the center thereof, is controlled by properly shaping or sloping the reflecting surfaces in said transverse direction.

One form of scanning means hereinafter described as illustrative of the invention comprises a mirror helix made up of a plurality of thin elongated metallic strips of trapezoidal cross-section mounted side by side on a rotatable shaft, successive strips starting from one end being equally angularly displaced with respect to the adjacent preceding strip. One set of edges are beveled with respect to the axis of rotation, the bevel being greatest at the ends and progressively smaller toward the centrally located strips. These beveled edges are polished and treated, if necessary, to render the mirror reflecting. This mirror is preferably placed with its axis of rotation in a horizontal position. A strip light source shorter than the mirror helix and under control of incoming television image currents is positioned laterally of the helix parallel to its axis of rotation. The observer or observers view the mirror laterally from a position such that the reflected beams pass therethrough.

The invention will now be described more in detail having reference to the accompanying drawings.

Fig. 3 is a diagram showing how the shapes of the mirror surfaces of Figs. 1 and 2 are determined.

Fig. 4 is a modification of Fig. 3.

Figs. 5 to 8 illustrate modified forms which the mirror surfaces may assume.

Like reference characters indicate like elements in the several figures.

Figure 1:
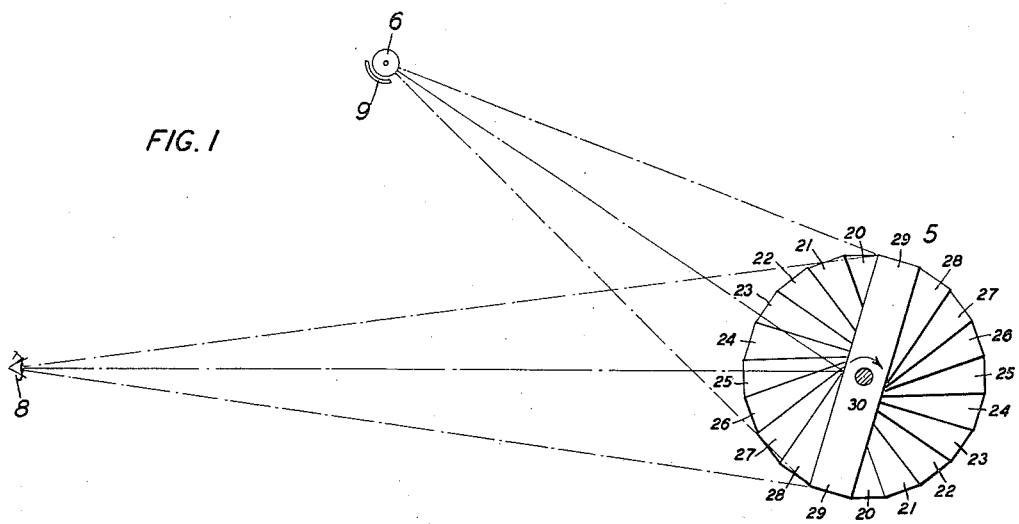
Fig. 1 is a side view of a television receiving arrangement employing a mirror helix according to this invention.
Figure 2:
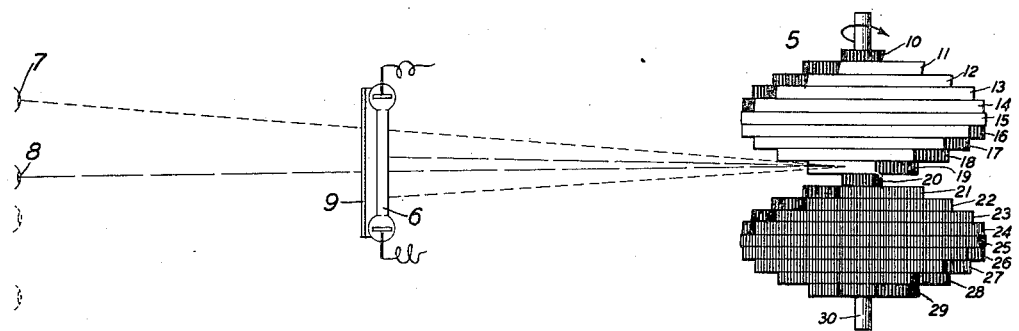
Fig. 2 is a top view of the arrangement of Fig. 1.

Referring now to Figs. 1 and 2 a rotatable scanning device 5 is arranged to be illuminated by a gaseous discharge lamp 6 for observation by an observer indicated by eyes 7 and 8. Additional observation points are indicated by the dotted eyes. The lamp 6 is energized by received image currents for television receiving purposes. The eyes of the observer are shielded from the direct rays of the lamp 6 by a shield 9.

The scanning device 5 consists of a plurality of thin, elongated, metallic strips 10 to 29 mounted side by side on a shaft 30. The strips are so oriented on the shaft that the long axes of successive strips are respectively angularly displaced by equal amounts from the long axis of the preceding strip. The resulting structure has somewhat the appearance of a twist drill, the faces of which are stepped.

The structure will now be described by reference to Fig. 3. In this diagram the strips are shown so oriented that the long axes of all of them lie in the same plane, which plane intersects the axis of the shaft on which the strips are mounted and is perpendicular to the plane of the paper. The short axes of the strips lie in the plane of the paper. The left hand edges are beveled as shown in Fig. 3 and the amount of this bevel is determined geometrically. The bevel for strip 29 will be described in detail. From this description then it will be obvious that the bevels for the other strips may be determined in a similar manner. About the point 31 as a center a circle 32 is drawn. At the point of intersection of this circle with the short axis of strip 29 a tangent 33 to this circle is drawn. The face 34 of strip 29 is then made parallel to this tangent line. By locating a relatively short light source 6 at a point approximately half way between the center 31 and the circle 32, rays of light from each of the strips 10 to 29 will reach the eyes 7 and 8 as indicated by the dashed lines.

In order to produce the scanning elements in the form shown in Figs. 1 and 2, each succeeding strip starting, for example, with strip 10 is turned through equally increased angles and finally clamped into position by any suitable clamping means. For the 20 strips shown the angle between the long axes of adjacent strips is 18°, which is the angle between the long axes of strips 10 and 11, and likewise that between the long axes of any two adjacent strips. In the arrangement shown, only 20 strips are employed corresponding to a 20-line structure in the received television image. For greater detail, of course, a larger number of strips would be used, but for an understanding of the invention it is not necessary to show such a large number.

The beveled surfaces are polished and plated, if necessary, to make them mirror-like reflecting. The ends of the strips and the edges opposite the beveled edges are rendered as nearly as possible light absorbing in any suitable manner. A dead black paint may be used for this purpose. In Fig. 2 these non-reflecting edges are indicated by the shading.

In the modification of Fig. 4 the reflecting surfaces before being rotated to produce the helical device, coincide exactly with the circle 32. The opposite edges are given substantially the same contour in order to produce a balanced structure. With this structure if the light source and the observer's eye are placed at the conjugate foci of the cylindrical concave mirror faces, a point source of light can be used. In practice, however, a somewhat elongated source would be used in order to provide greater leeway in the observer's position.

In Fig. 5 an enlarged end view of strip 29 of Fig. 3 is shown. Edge 35 is mirror-like reflecting, while edge 36 is non-reflecting. The ends, of course, are also non-reflecting.

In Fig. 6 an end view of strip 29 of Fig. 4 is shown on an enlarged scale. The edge 37 is a concave cylindrical surface.

In Fig. 7 the reflecting surface 38 is slightly convex so that an elemental light beam incident thereon is diffused in planes parallel to the axis of rotation, while such an elemental beam encounters plane mirror reflection in planes parallel to a perpendicular to the axis of rotation, that is, in planes parallel to the long axes of the strips. With this type of reflecting surface a concentrated source of light can be used and still permit of viewing from relatively widely separated positions.

In Fig. 8 another form of diffusing surface 39 is illustrated and consists of ribs or corrugations extending lengthwise along the reflecting edge. Such a surface is operative with a smaller elemental light beam.

The relative distances between the light source 6, scanning device 5 and the observer's eyes 7 and 8 are drawn out of proportion in order to facilitate illustration. In practice the light source and the observer are so located that light from a single strip is visible at any instant. The length of the light source is such that all of the reflecting surfaces can be observed over a reasonable range of viewing positions. A suitable radius for the circle 32 is 2½ times the length of the scanning device 5 measured along the axis of rotation.

The curvature of the reflecting surfaces as determined in accordance with Fig. 4, may conform to a parabola instead of a circle or to a curve approaching a parabola or a circle.

In the specific arrangement disclosed the scanning device 5 rotates about a horizontal axis for direct viewing. This is the preferred arrangement, but the invention is not limited in this respect.

What is claimed is:

1. Scanning means comprising a rotatable mirror device having a plurality of reflecting surfaces helically positioned about the axis of rotation, and a primary source of light for said device positioned laterally thereof and having considerable extent in a direction parallel to said axis but less than the extent of the combined reflecting surfaces in the direction of said axis.

2. Scanning means comprising a rotatable mirror device having a plurality of reflecting surfaces helically positioned about the axis of rotation, and a primary strip light source for said device positioned laterally thereof and extending in a direction substantially parallel to said axis, the extent of said light source in a direction parallel to said axis being less than the extent of the combined reflecting surfaces in said direction.

3. Scanning means comprising a rotatable mirror device having a plurality of elongated reflecting surfaces helically positioned about the axis of rotation and having their longer sides bounded by planes perpendicular to said axis, and a primary source of light positioned laterally of said device and having considerable extent in a direction parallel to said axis but less than the extent of the combined reflecting surfaces in the direction of said axis.

4. Scanning means comprising a rotatable mirror device having a plurality of elongated reflecting surfaces helically positioned about the axis of rotation and having their longer sides bounded by planes perpendicular to said axis, and a primary strip source of light positioned laterally of said device and of less extent than said device in a direction parallel to said axis and of relatively very small extent in a direction perpendicular to said axis.

5. Scanning means comprising a rotatable mirror device having a plurality of elongated reflecting surfaces helically positioned about the axis of rotation and having their longer sides bounded by places perpendicular to said axis, and a primary strip source of light shorter than said device and having its major axis substantially parallel to said axis of rotation.

6. Scanning means comprising a rotatable mirror device having a plurality of elongated reflecting surfaces helically positioned about the axis of rotation and having their longer sides bounded by planes perpendicular to said axis, each of said surfaces being curved in a direction perpendicular to its length.

7. Scanning means comprising a rotatable mirror device having a plurality of elongated reflecting surfaces helically positioned about the axis of rotation and having their longer sides bounded by planes perpendicular to said axis, each of said surfaces comprising longitudinal portions lengthwise thereof each having curvature in the direction transverse to its length.

8. Scanning means comprising a rotatable mirror device having a plurality of elongated reflecting surfaces helically positioned about the axis of rotation and having their longer sides bounded by planes perpendicular to said axis, each of said surfaces having a contour which is concave outwardly in the direction transverse to its length.

9. Scanning means comprising a rotatable mirror device having a plurality of elongated reflecting surfaces helically positioned about the axis of rotation and having their longer sides bounded by planes perpendicular to said axis, and a strip source of light positioned laterally of said device and of less extent in a direction parallel to said axis than the extent of the combined reflecting surfaces, the combined contour of the surfaces along respective intersections thereof with planes respectively equidistant from the mid point of the shorter sides of the surfaces being such that light beams reflected from said surfaces will pass successively through a certain point in space lying in a line perpendicular to said axis, as said device is rotated.

10. Scanning means comprising a rotatable mirror device having a plurality of elongated reflecting surfaces helically positioned about the axis of rotation and having their longer sides bounded by planes perpendicular to said axis, the minimum distance from said axis to said surfaces respectively progressively varying in the direction of said axis.

11. Scanning means comprising a rotatable mirror device made up of a plurality of strip elements each having a mirror edge which forms a reflecting surface, said surfaces being helically positioned about a common axis of rotation through said strips, the minimum distance from said axis to said surfaces respectively progressively changing in the direction of said axis.

12. Scanning means comprising a rotatable mirror device having a plurality of elongated reflecting surfaces helically positioned about the axis of rotation, each of said surfaces being so shaped that its intersection with any plane including said axis is curved, and a strip source of light substantially parallel to said axis.

13. Scanning means comprising a rotatable mirror device having a plurality of cylindrical reflecting surfaces helically positioned about the axis of rotation, and a strip source of light shorter than said device positioned laterally thereof substantially parallel to said axis.

14. Scanning means comprising a rotatable mirror device having a plurality of elongated reflecting surfaces helically positioned about the axis of rotation and means for directing light to each of said surfaces in turn from all the elemental areas of a strip like region in space extending substantially parallel to said axis for a distance less than the length of said device.

15. Scanning means comprising a rotatable mirror device having a plurality of elongated reflecting surfaces helically positioned about the axis of rotation and means for directing light to each of said reflecting surfaces in turn from all the elemental areas of a strip shaped region in space having its long dimension less than said device so that the reflected moving beams will all pass through a given fixed point in space in succession.

16. Scanning means comprising a rotatable mirror device having a plurality of elongated reflecting surfaces helically positioned about the axis of rotation with their long dimensions in planes perpendicular thereto, each of said surfaces having a curved crosswise contour, and means for directing light to each of said reflecting surfaces in turn from all the elemental areas of a strip shaped region in space so that the reflected moving beams will all pass through a given fixed point in space in succession.

17. Scanning means comprising a rotatable mirror device having a plurality of elongated surfaces helically positioned about the axis of rotation and having their longer sides bounded by planes perpendicular to said axis, one of said surfaces being at a different distance from the axis of rotation than others, each distance being measured along a line connecting the axis of rotation with the longer axis of the reflecting surface and perpendicular to both said axes.

18. Scanning means comprising a rotatable mirror device having a plurality of elongated reflecting surfaces helically positioned about the axis of rotation and having their longer sides bounded by planes perpendicular to said axis, one of said surfaces being at a different distance from the axis of rotation than others, each distance being measured along a line connecting the axis of rotation with the longer axis of the reflecting surface and perpendicular to both said axes, said surfaces being differently inclined with respect to lines therethrough parallel to said axis of rotation.

19. Scanning means comprising a rotatable mirror device comprising a plurality of elongated elements helically positioned about a common axis of rotation and each having a mirror surface of such shape that it could be generated by a straight line perpendicular to said axis of rotation and moved from one of the longer sides of the element to the other so as always to be parallel thereto and alternately nearer to and farther from said axis of rotation.

20. Scanning means comprising a rotatable mirror device having a plurality of elongated reflecting surfaces helically positioned about the axis of rotation and having their longer sides bounded by planes perpendicular to said axis, each of said surfaces being ribbed in a direction substantially parallel to its length.

FRANK GRAY.